United States Patent [19]

Adachi

[11] Patent Number: 5,108,073
[45] Date of Patent: Apr. 28, 1992

[54] BUTTERFLY VALVE AND DRIVE MECHANISM FOR ROTATION AND RECIPROCATION OF VALVE STEM OF THE BUTTERFLY VALVE

[75] Inventor: Ryoji Adachi, Higashi-Osaka, Japan

[73] Assignee: Osaka Kikiseizo Kabushiki Kaisha, Higashi-Osaka, Japan

[21] Appl. No.: 389,876

[22] Filed: Aug. 4, 1989

[30] Foreign Application Priority Data

Aug. 5, 1988 [JP] Japan ............................ 63-103937[U]
Aug. 5, 1988 [JP] Japan ............................ 63-103938[U]

[51] Int. Cl.⁵ .............................................. F16K 1/24
[52] U.S. Cl. ..................................... 251/163; 251/252
[58] Field of Search ............... 251/56, 162, 163, 164, 251/165, 166, 229, 252; 74/424.8

[56] References Cited

U.S. PATENT DOCUMENTS

| | | | |
|---|---|---|---|
| 3,046,802 | 7/1962 | Cupedo | 251/162 X |
| 3,492,880 | 2/1970 | Pearson | 251/58 X |
| 4,167,263 | 11/1979 | Cupedo | 251/163 X |
| 4,350,322 | 9/1982 | Mueller | 251/229 |
| 4,730,511 | 3/1989 | Tsujimura | . |

FOREIGN PATENT DOCUMENTS

| | | | |
|---|---|---|---|
| 555373 | 2/1960 | Belgium | 251/163 |
| 46-14779 | 4/1971 | Japan | . |
| 58-28061 | 2/1983 | Japan | . |

*Primary Examiner*—John C. Fox

[57] ABSTRACT

A butterfly valve of the type wherein a valve stem is prevented from sliding engagement with a valve seat is disclosed which assures more complete shaft sealing without causing any inconvenience to the controllability of the valve body and valve stem and can thus advantageously prevent fluid from leaking outwardly of a valve casing. A drive shaft rotatable and reciprocable in longitudinal directions of the valve stem is connected to an outer end of the valve stem. The valve casing extends so as to cover the drive shaft, and a packing member is disposed between the valve casing and the drive shaft to provide a shaft seal for the drive shaft. The rotation of and reciprocating movement of the drive shaft connected to the butterfly valve are performed by a simple drive mechanism. That is, the rotation of and the reciprocation of the drive shaft are accomplished only through rotation of a control shaft.

8 Claims, 8 Drawing Sheets

BUTTERFLY VALVE AND DRIVE MECHANISM FOR ROTATION AND RECIPROCATION OF VALVE STEM OF THE BUTTERFLY VALVE

BACKGROUND OF THE INVENTION

1. Field of the Invention

The present invention relates to a butterfly valve of the type which performs valve opening and closing without involving slide engagement of a valve stem with a valve seat. A drive mechanism is provided for rotation and reciprocating motion of the valve stem of the butterfly valve.

2. Description of Background Art

Figure 8:
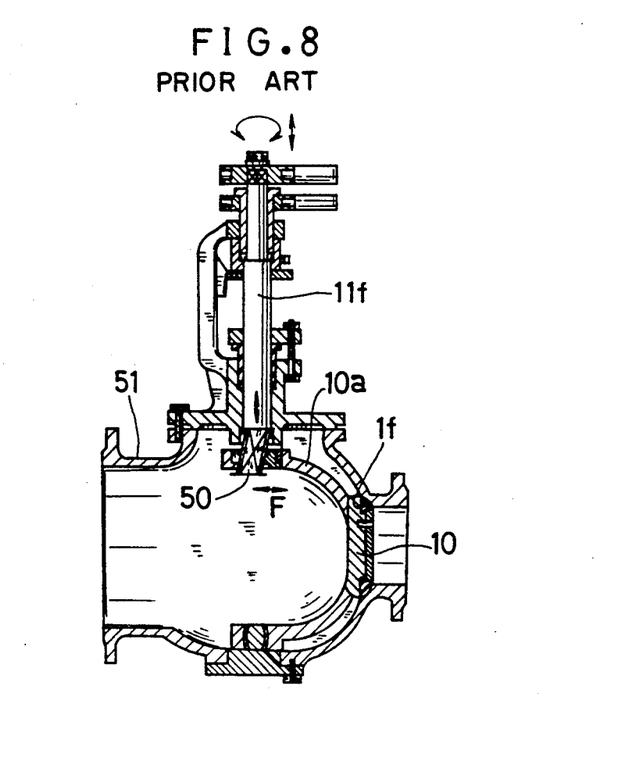
FIGS. 8 through 10, inclusive, are sectional views showing a prior art arrangement.

A butterfly valve of this type is disclosed in Japanese Patent Publication No. 46-14779. According to FIG. 8 of the drawings, an upper portion 10a of a valve body 10 facing a valve seat 1f is slidably fitted over a tapered portion 50 of a valve stem 11f. Up and down movement of the valve stem 11f causes oscillation of the upper portion 10a of the valve body 10 in the direction shown by F so that the upper portion 10a is brought in pressure engagement with and disengaged from the valve seat 1f. This arrangement has an advantage in that the valve body 10 can be rotated when it is away from the valve seat 10. Thus, it is possible to conveniently avoid wear of the valve body 10. However, this butterfly valve has a disadvantage in that the tapered portion 50 of the valve stem 11f is positioned within a valve casing 51 in which fluid flows. The fluid may be thrust into a contact area between the tapered portion 50 and the valve stem 11f, thus hindering the movement of the elements.

A butterfly valve intended to overcome this disadvantage is disclosed in Japanese Patent Laid-Open Publication No. 58-28061. According to FIG. 9 of the drawings, a valve stem 11 connected to a valve body 10 is formed with a spherical protuberance 25 where the valve stem 11 and the valve body 10 are pivotally and rotatably supported. Oscillation and rotation of the valve stem 11 and valve body 10 is controlled at the outer end side of the valve stem 11.

Figure 9:
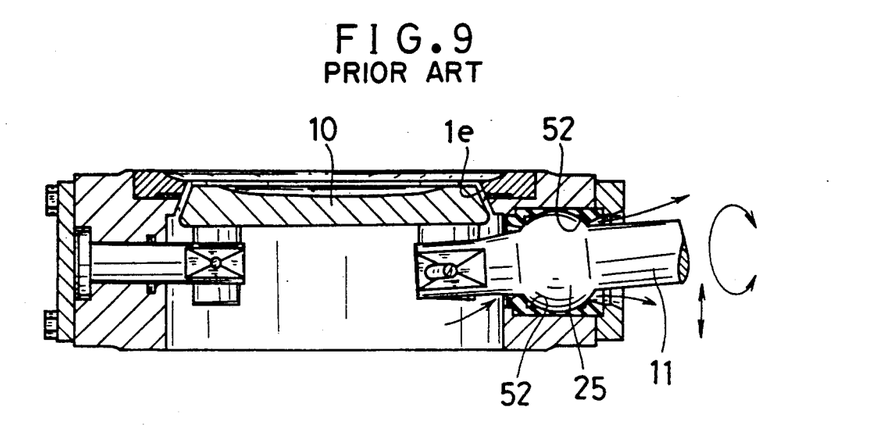

This arrangement provides advantages in that the valve opening and closing can be carried out without involving a slide engagement of the valve body 10 with a valve seat 1e. In addition, thrusting of the fluid into a contact area between the valve body 10 and the valve stem 11 can be prevented. The force required in the oscillation of the valve body 10 and valve stem 11 about the spherical protuberance 25 is very small because the principles of the lever and the fulcrum are utilized in the connection.

In this type of butterfly valve, consideration is required to prevent the fluid within the valve casing from leaking outwardly from the location at which the valve stem 11 is fitted in position. For this purpose, packing members 52, such as O rings, are mounted in position at the location of the spherical protuberance 25.

Figure 10:
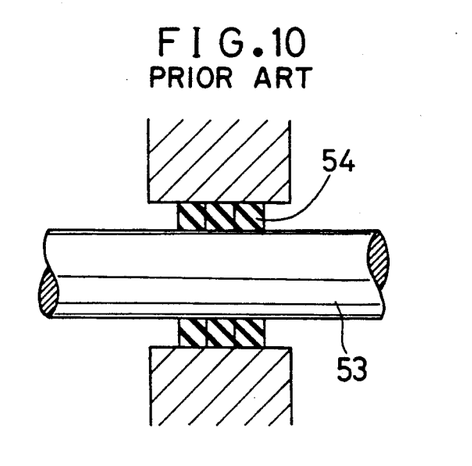

However, the use of packing 52 in abutment with the spherical protuberance 25 constitutes a deviation from the primary conditions for the use of packing. This type of packing cannot only provide a good seal when compared with, for example, the packing as illustrated in FIG. 10 in which packing 54 is held in contact with a conventional rotary shaft 53. The packing 52 makes it extremely difficult to provide proper contact of the packing with the spherical surface for satisfactory sealing.

The prior art valve arrangements are very likely to cause fluid leaks from the sealing portion at the valve stem 11. The leaking at the valve stem 11 is a serious problem.

SUMMARY OF THE INVENTION

Accordingly, it is an object of the invention to provide a solution to the foregoing problem with a butterfly valve of the type in which a valve body is prevented from slide engagement with a valve seat. This arrangement assures a more complete shaft sealing without involving any inconvenience in the control of the valve body and a valve stem. Thus, fluid is suitably prevented from leaking outwardly of a valve casing.

The object of the present invention can be accomplished by connecting to the valve stem a separate shaft for enabling shaft sealing far more satisfactorily than a spherical protuberance of a valve stem as in the prior art. Thereby, complete shaft sealing at the separate shaft is provided by arranging for enabling the valve stem to perform required valve opening and closing operations through control of the separate shaft.

Thus, the butterfly valve in accordance with the present invention includes an outwardly extending drive shaft provided adjacent the outer end of a valve stem connected to a valve body and formed with a spherical protuberance. The drive shaft is rotatable forward and reverse and reciprocable in longitudinal directions of the valve stem. One end of the drive shaft is connected to the outer end of the valve stem to enable the valve stem to rotate in cooperation with the rotation of the drive shaft and to oscillate in cooperation with the reciprocating movement of the drive shaft in the longitudinal directions. A packing member for shaft sealing with respect to the drive shaft is disposed between the drive shaft and an outwardly extending valve casing for covering the outer peripheries of the valve stem and of the drive shaft.

In the butterfly valve of the invention, constructed as above stated, the valve stem and the valve body can be rotated through the rotational movement of the drive shaft and can also be oscillated through the reciprocating movement of the drive shaft. Thus, the valve body can be rotated for engagement with and disengagement from a valve seat. Even if shaft sealing is incomplete at the spherical protuberance of the valve stem and if the fluid in the valve casing passes the position at which the spherical protuberance is supported, the fluid can be properly prevented from leaking outwardly of the valve casing because of the presence of the sealing packing provided between the drive shaft and the valve casing. Unlike shaft sealing with respect to the spherical protuberance, the shaft sealing with respect to the drive shaft assures that the packing is properly fitted over the drive shaft for close contact therewith. Therefore, the present invention has a definite advantage in its tight sealing performance over conventional sealing with respect to the spherical protuberance.

As stated above, the drive shaft, rotatable and reciprocable in the longitudinal directions of the valve stem, is connected to the outer end of the valve stem so that the valve stem is enabled to perform the required rotation and oscillation in association with the rotation and reciprocating movement of the drive shaft. In addition, the packing is mounted between the drive shaft and the valve casing extension provided for covering the drive shaft. Therefore, the shaft sealing with respect to the drive shaft provides a more satisfactory airtight seal than by sealing through a packing member mounted for contact with a pivotable and rotatable spherical surface. Thus, it is possible to almost completely seal the fluid which may otherwise leak from the position at which the spherical protuberance of the valve stem is present.

Any possible fluid leak outward from the valve casing can now be more accurately prevented than ever before. Accordingly, the butterfly valve of the present invention assures improved service performance.

It is another object of the present invention to provide a simple construction of a drive mechanism for enabling the valve stem of the butterfly valve to independently perform a rotational movement and a reciprocating movement.

A drive mechanism for rotational and reciprocable movement of a valve stem of a butterfly valve includes a cylindrical cam connected at one end to a drive shaft having helical cam grooves formed in its peripheral wall. A casing allows the cylindrical cam to be slidably received and supported therein in its axial direction and also in its peripheral direction. A control shaft is rotatably received in the cylindrical cam and includes a screw shaft portion positioned in the cylindrical cam. A screw element is threadedly fitted on the screw shaft portion of the control shaft and is prevented from rotating. The screw element is threadedly movable in axial directions of the cylindrical cam following the rotational movement in the control shaft. Cam followers are mounted to the screw element and held in engagement with the helical cam grooves of the cylindrical cam. The cylindrical cam further includes a generally L-shaped cam grooves formed in its peripheral wall. The L-shaped cam grooves each consist of a longitudinal groove portion extending in the longitudinal direction of the cylindrical cam and a side groove extending in the peripheral direction of the cylindrical cam. The L-shaped cam grooves are engaged by stationary cam followers. When the cam followers are in engagement with the side groove portion, the cylindrical cam is prevented from movement in its longitudinal directions to allow it to rotate. When the cam followers are in engagement with the longitudinal groove portion, the rotation of the cylindrical cam is prevented to allow it to move in the longitudinal directions.

According to this arrangement of the drive mechanism as stated above, the control shaft is actuated to rotate to operate the cylindrical cam. First, as the control shaft is rotated when each of the stationary cam followers is positioned in the side groove portion of the L-shaped cam groove, the screw element, prevented from rotational movement, is threadedly moved in the longitudinal direction of the cylindrical cam. Accordingly, the cam followers mounted to the screw element operate to push the cylindrical cam in the longitudinal direction. The cylindrical cam, which is then prevented from movement in longitudinal directions because of the engagement of the stationary cam followers with the side groove portions, is only allowed to rotate through the guiding action of the helical grooves which are in engagement with the cam followers. Thus, the drive shaft is provided with rotational movement.

When, through rotation of the cylindrical cam, the stationary cams are repositioned from the side groove portions of the L-shaped cam grooves to the longitudinal groove portions continued therefrom, rotation of the cylindrical cam is prevented because of the engagement between the longitudinal groove portions and the stationary cam followers. Whereupon, the cylindrical cam is allowed to move in a longitudinal direction thereof. Therefore, as the control shaft is rotated to actuate the screw element and the cam followers into movement in longitudinal direction, the cam followers urge the cylindrical cam toward one longitudinal direction thereof. Whereupon, the cylindrical cam and the drive shaft go into movement in the longitudinal direction without involving rotation.

As stated above, according to the invention, helical cam grooves and generally L-shaped cam grooves are formed in the peripheral wall of a cylindrical cam connected at one end to a drive shaft. Threadedly movable cam followers are allowed to engage the helical cam grooves as a control shaft rotates. Simultaneously, stationary cam followers are allowed to engage with the generally L-shaped cam grooves. Thus, when the stationary cam followers are positioned in the L-shaped cam grooves, the cylindrical cam is enabled to rotate, while being prevented from movement in longitudinal directions, under the advancing force of the cam followers which are in engagement with the helical cam grooves. When the stationary cam followers are positioned in the longitudinal groove portions of the generally L-shaped grooves, the cylindrical cam is enabled to reciprocate, while being prevented from rotating, under the advancing force of the cam followers. Therefore, rotation and reciprocation of the drive shaft alone is made possible only through rotation control of the control shaft. As such, the arrangement of the invention has a definite advantage over the prior art arrangement which requires manual handle control separately for rotation and reciprocation of the drive shaft. Control operations of the present invention can be performed in a very easy and simple manner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3b is a section taken on line X—X in FIG. 3a;

DETAILED DESCRIPTION OF THE PREFERRED EMBODIMENTS

One embodiment of the invention will now be described which is applied, by way of example, as a butterfly valve for hot fluid service.

Figure 1:
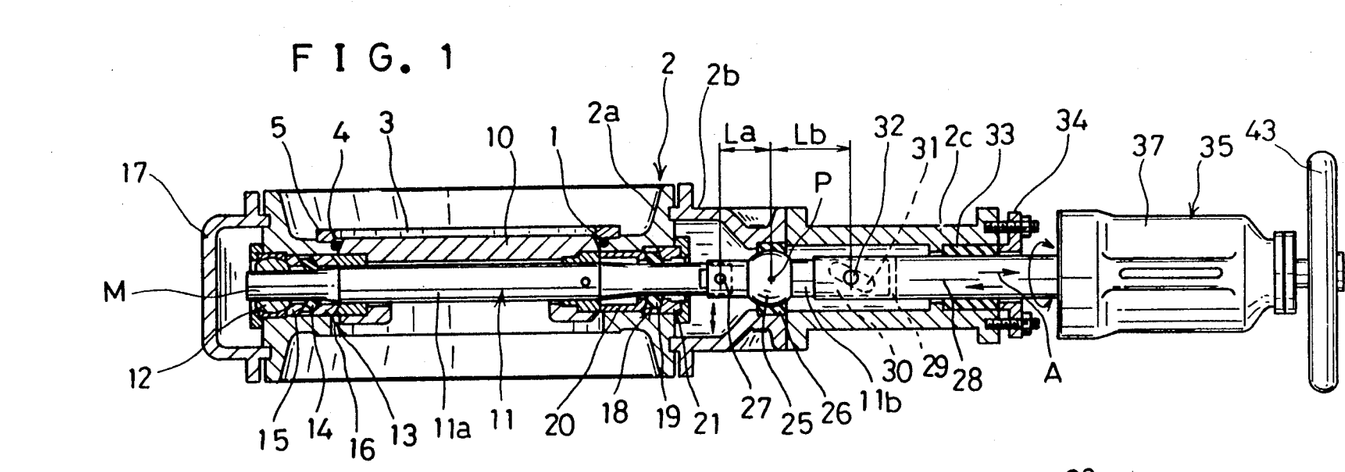
FIG. 1 is a sectional view showing one embodiment of the butterfly valve according to the invention.

In FIG. 1, a valve casing 2 includes a valve casing body 2a having an opening 3 for fluid passage, and auxiliary valve casings 2b, 2c sequentially connected thereto. A valve seat 1 is formed on the peripheral edge of the opening 3. The valve seat 1 comprises a seal ring 4 fixed in position by being held between ring members 5.

A valve body 10 is disposed in a face-to-face relation to the valve seat 1. A first valve stem 11a is mounted to a lower portion of the valve body 10. The first valve stem 11a, together with a second valve stem 11b which will be hereinafter described, constitutes a valve stem 11. A spherical bearing 12 rotatably supports first valve stem 11a at one end. The first valve stem 11a and the valve body 10 are oscillatable and rotatable about a center position M of the bearing 12. A seal mechanism 13 is provided for sealing an inner side portion of the bearing 12 in a simple manner. Two spherical sides of a collar member 14 fixed to the valve stem 11 are slidably held between two holding pieces 15, 16 of the seal mechanism 13. A cover member 17 is provided to close an outer side of the spherical bearing 12. Because of the presence of the cover member 17 outward fluid leak is prevented if the fluid passes through the seal mechanism 13 and spherical bearing 12.

A seal mechanism 18 is provided for sealing the other end of the first valve stem 11a which extends through the other end of the valve casing body 2a. The seal mechanism 18 functions in the same way as the end side seal mechanism 13. Two spherical sides of a collar member 19 fixed to the first valve stem 11a are slidably held between two holding pieces 20, 21 of the seal mechanism 18.

Figure 2:
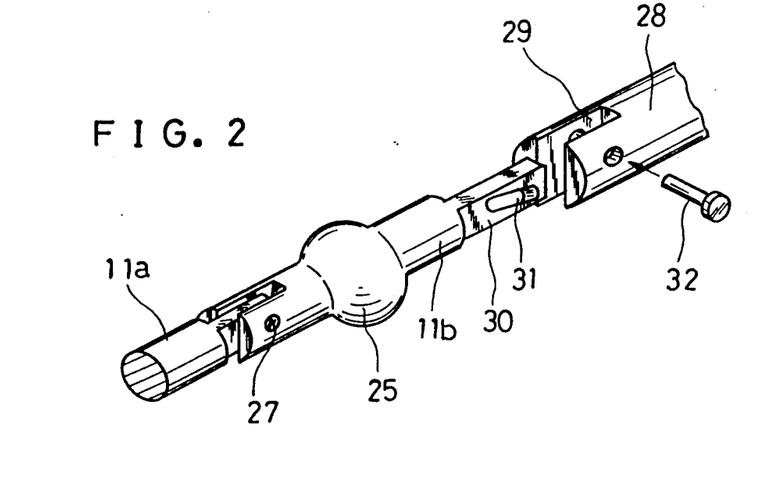
FIG. 2 is a perspective view showing, by way of example, the manner in which a drive shaft and a valve stem are connected together.

The second valve stem 11b is rotatably and oscillatably disposed in the valve casings 2b, 2c and includes a spherical protuberance formed generally centrally thereon. The spherical protuberance 25 is supported by a spherical bushing 26. As illustrated in FIG. 2, the second valve stem 11b is connected at one end to the outer end of the first valve stem 11a through a pin 27 to transmit the rotating and oscillating movement of the second valve stem 11b to the first valve stem 11a.

A drive shaft 28 extends through the valve casing 2c and includes an open cut groove 29 formed in one end portion. As illustrated in FIG. 2, the other end 30 of the second valve stem 11b is positioned in the groove 29. An inclined elongate hole bored 31 is provided in the other end portion 30. A guide pin 32 extends through the elongate hole 31 and is fixed to the drive shaft 28. It is noted that distance La between the center position P of the spherical protuberance 25 of the second valve stem 11b and the point of connection with the first valve stem 11a is set shorter than distance 1b between the center position P and connection point with the drive shaft 28. A gland packing 33 is mounted for shaft sealing with respect to the drive shaft 28, which is inserted into the valve casing 2c through its outer opening and inwardly pressed by packing presser 34.

A rotation/reciprocation drive mechanism 35 is provided for forward and reverse rotation of the drive shaft 28 and for reciprocation of the drive shaft 28 in the longitudinal directions. One particular arrangement of the drive mechanism is described below.

Figure 3A:
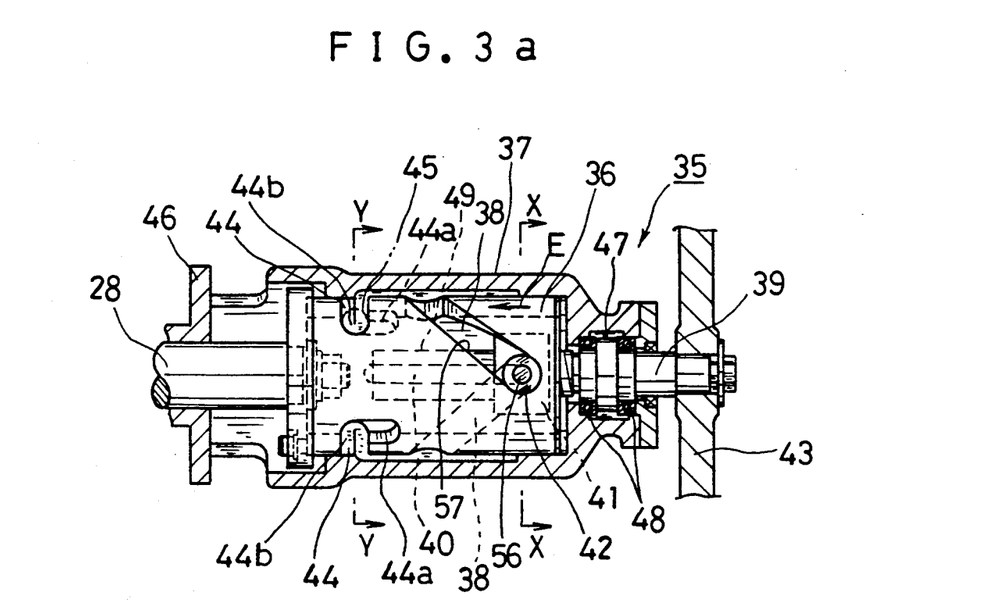
FIG. 3a is one embodiment of the drive mechanism according to the invention, illustrating a fragmentary sectional view in front elevation.
Figure 3B:
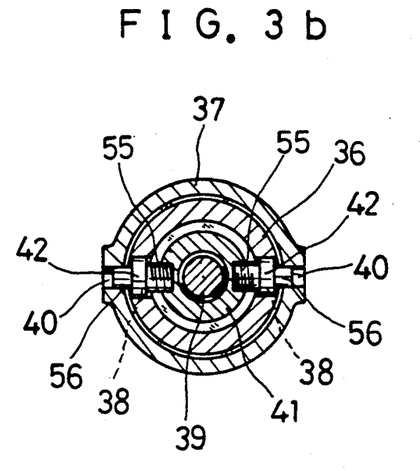
Figure 3C:
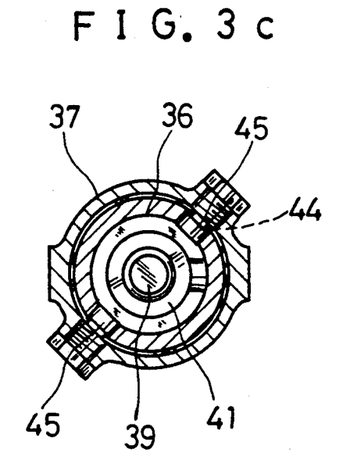
FIG. 3c is a section taken on line Y—Y.
Figure 4:
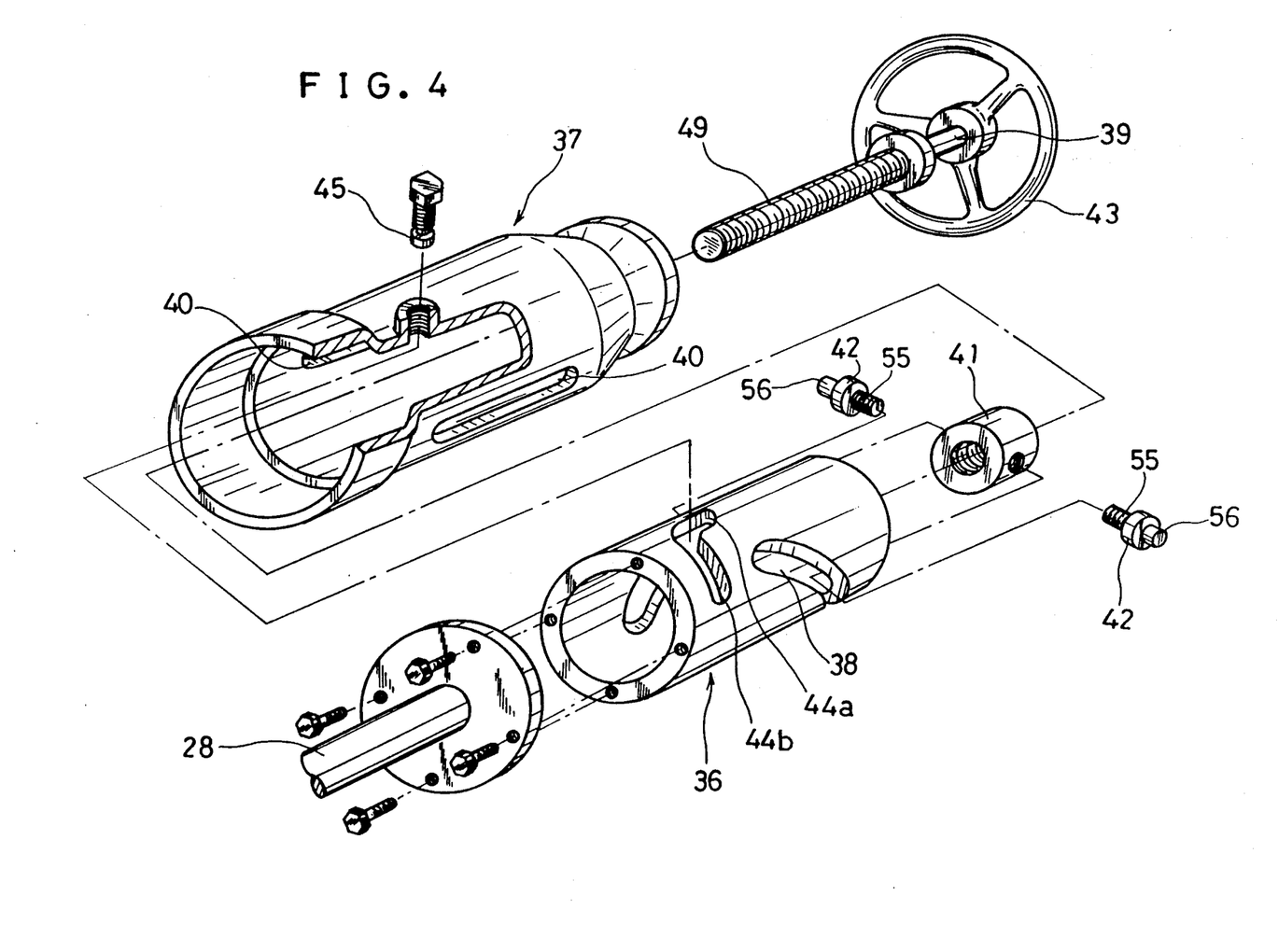
FIG. 4 is an exploded view of the drive mechanism.

As illustrated in FIGS. 3 and 4, a generally cylindrical casing 37 having a flange 46 is provided at one end for mounting the casing 37 to another member. Elongate holes 40 are bored in the casing 37 at both sides, which extend in the longitudinal direction. A cylindrical cam 36 is slidably inserted in the casing 37. The drive shaft 28 is connected to the front side of the cylindrical cam 36.

Two helical cam grooves 38, 38 are bored in the peripheral wall of the cylindrical cam 36 within an angular range of, for example, 90 degrees. Two generally L-shaped cam grooves 44, 44 are also bored in the peripheral wall of the cylindrical cam 36. Each of the L-shaped cam grooves consists of two portions, a longitudinal cam groove 44a extending in the longitudinal direction of the cylindrical cam 36, and a side groove 44b continued from the longitudinal cam groove 44a and extending in the peripheral wall direction of the cylindrical cam 36. Similarly to the helical cam grooves 38, the side cam grooves 44b are formed within an angle range of, for example, 90 degrees. Stationary cam followers 45 are disposed in side wall portions of the casing 37 and are stationarily held in position by being placed in thread engagement with side wall portions of the casing 37. The front end portions of the stationary cam followers 45 are held in engagement with the L-shaped cam grooves 44, 44.

A control shaft 39 is coaxially inserted in the cylindrical cam 36 through a hole which is open through the other end of the casing 37, and is rotatably supported in a thrust bearing 48. A control handle 43 is fixed to a rear end portion of the control shaft 39. A screw shaft portion 49 is formed by externally threading the outer periphery of the control shaft 39 at the front end portion thereof.

A screw element 41 of a generally cylindrical shape has an internally threaded portion formed on the internal periphery thereof. The screw element 41 is fitted in the screw shaft portion 49 and held in thread engagement therewith. A pair of cam followers 42 are fixed to the screw element 41 through a shaft 55 and are individually fitted in the helical cam grooves 38, 38 for engagement therewith. An engagement pin 56 projects outwardly to a greater extent relative to each of said cam followers 42. A plurality of pins 56 are provided in engagement with the elongate holes 40 at sides of the casing 37 to prevent the screw element 41 and cam followers 42 from rotating in the peripheral direction of the cylindrical cam 36.

The manner of operation of the above described butterfly valve and the function of the drive mechanism for rotation and reciprocation of the valve stem of the butterfly valve will hereinafter be explained.

Figure 5:
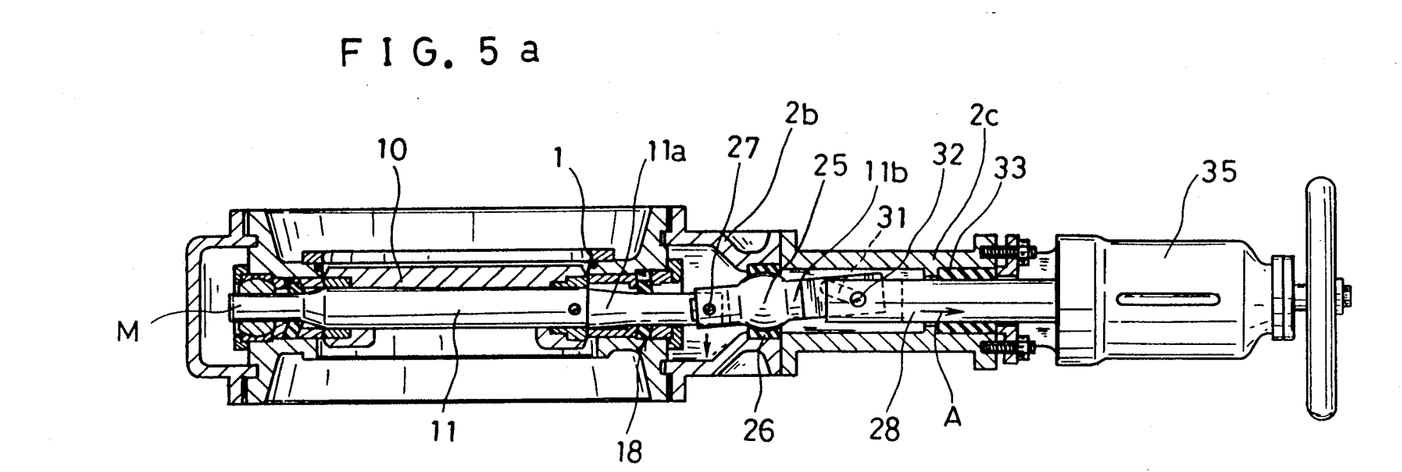
FIG. 5a is a sectional view of the butterfly valve showing the manner of operation of a valve body relative to a valve sheet, wherein the valve body is disengaged from the valve seat.
FIG. 5b is a sectional view showing the valve body as having turned 90 degrees relative to the valve seat.
FIG. 5c is a sectional view showing the valve body as having returned to the condition of FIG. 5a after making a turn of 90 degrees relative to the condition of FIG. 5b.
FIG. 5d is a sectional view showing the valve body in contact with the valve seat.

When the valve body 10 is in face-to-face abutment relation, as illustrated in FIG. 1, the valve is in a closed position, the rotation/reciprocation drive mechanism is controlled so that the drive shaft 28 is driven to slide in the direction of arrow A. As illustrated in FIG. 5(a), the guide pin 32 extending through the inclined elongate hole 31 causes the right side end of the second valve stem 11b to move upwardly. Thereupon, the second valve stem 11b oscillates about the spherical protuberance 25 so that its left side end is lowered. Accordingly, the right side end of the first valve stem 11a which is connected to the second valve stem 11b through pin 27 oscillates about point M and moves downwardly. As a consequence, the valve body 10 is disengaged from the valve seat 1.

Figure 5C:
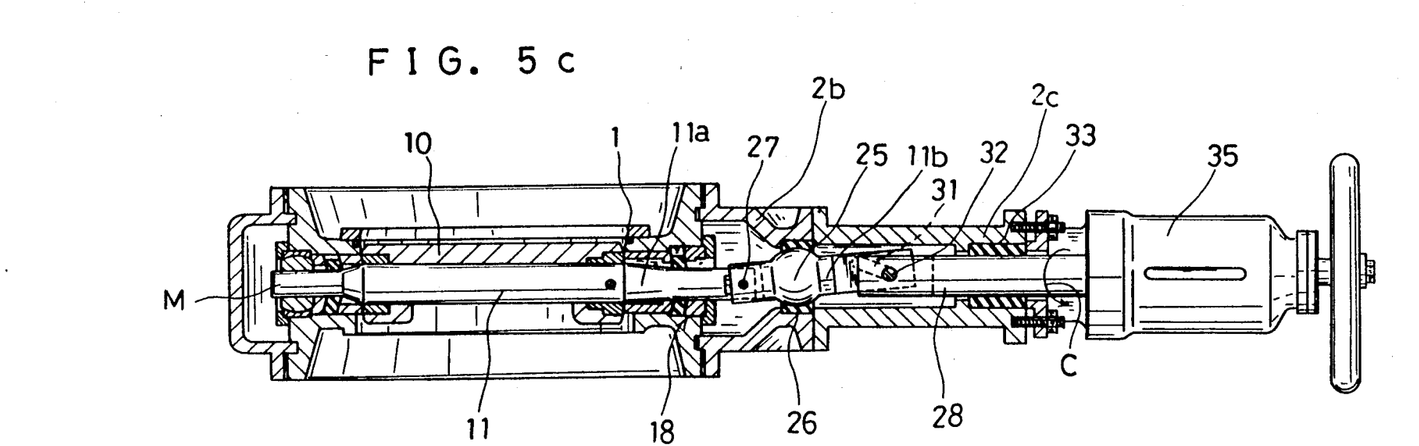
Figure 5D:
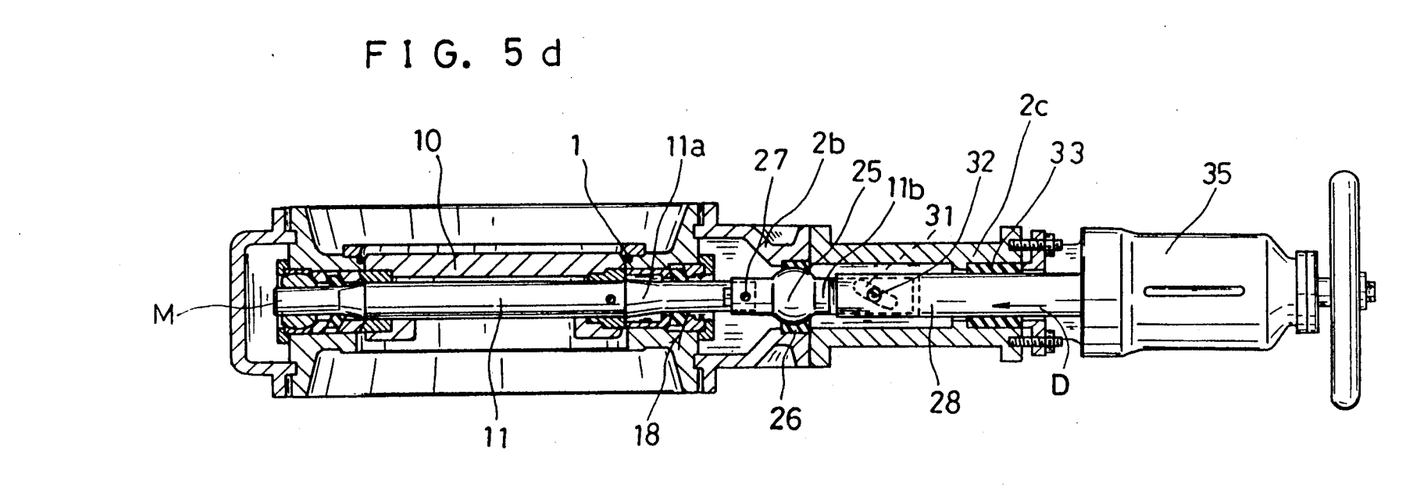

Next, when the above condition remains as such, as illustrated in FIG. 5b, the drive shaft 28 is rotated in the direction of arrow B, the second valve stem 11b and first valve stem 11a, which are connected to each other through pins 32, 27, rotate in association with each other and the valve body 10 turns, e.g., 90 degrees without involving slide movement. Thus, the valve can be set to a full-open position. To carry out a valve closing operation when the valve is in the full-open position, the above described procedure may be reversed. That is, as illustrated in FIG. 5c, the drive shaft 28 is rotated in the direction of arrow C; the valve body is turned 90 degrees; then, as illustrated in FIG. 5d, the valve body 10 is caused to slide in the direction of arrow D. In this way, the valve body 10 abuts with the valve seat for closing the valve, without sliding movement relative to the valve seat 1.

When fluid is flowing in the valve casing body 2a, during a valve opening operation, fluid run-off from the casing body 2a toward the casing 2b may be prevented at the position of the seal mechanism 18 to some extent. However, since the seal mechanism 18 is such that the spherical portions of the holder members 20, 21 are held in sliding contact with the spherical portions at the sides of the collar member 19, no complete sealing is attainable. Especially in the case of butterfly valves dealing with hot fluid, it is impractical to place resilient packing or the like at the position of the seal mechanism 18, the possibility of a fluid leak is greatly increased. Fluid entering the casing 2b can be sealed to some extent at the position of engagement between the spherical protuberance 25 and the spherical bushing 26, but still no complete sealing can be expected. Some portion of the fluid may enter the next casing 2c.

The drive shaft 28 in the valve casing 2c is sealed by means of gland packing 33, but the drive shaft 28 is a shaft mounted for rotation and sliding. Unlike means for holding and packing in close contact with the spherical portion, for example, means intended to perform shaft sealing at the position of the spherical protuberance 25 of the second valve stem, the drive shaft 28 permits tight engagement of the packing 3 with the columnar body of the drive shaft 28.

From the standpoint of primary service of packing, it is possible to ensure longer service life of the packing by carrying out shaft sealing with respect to the drive shaft 28 which is not mounted for oscillating movement. Thus, any unreasonable leak of fluid externally of the valve casing 2 can be properly prevented.

In the above embodiment, the valve stem 11 consists of the first valve stem 11a and the second valve stem 11b. As illustrated in FIG. 1, the length 1a is smaller than length 1b. Accordingly, only by applying a minor force from the drive shaft to the second shaft 11b, suitable pivotal movement of the first valve stem 11a and valve body 10 can be effected by virtue of the principles of the lever and the fulcrum.

Figure 7:
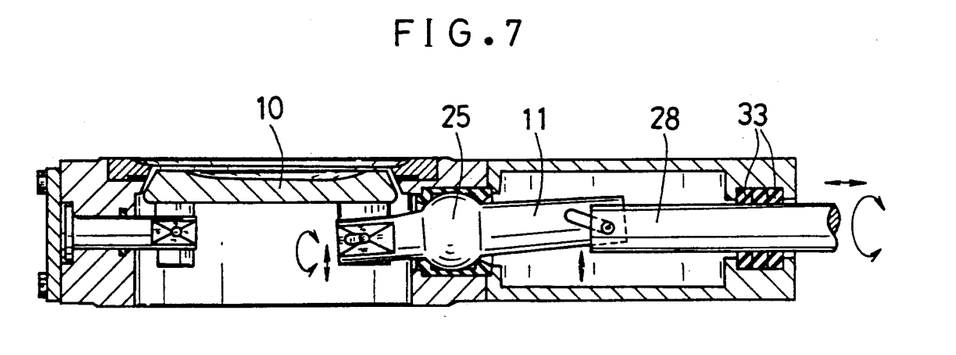
FIG. 7 is a sectional view showing another embodiment of the butterfly valve according to the invention.

However, the construction of the valve stem 11 according to the invention is in no way limited to the embodiment discussed hereinabove. For example, as illustrated in FIG. 7, the valve stem 11 consists of one shaft, and the opposite ends of the valve stem 11 are connected to the valve body 10 and the drive shaft 28, respectively. In another embodiment, the spherical protuberance 25 may be centrally formed and pivotally and rotatably supported. In this embodiment, the valve opening and closing operation as above described can be performed. Furthermore, the drive shaft 28 which performs rotation and reciprocating movement can be properly shaft-sealed by means of packing material.

In short, the valve stem 11 according to the present invention may take various modified forms insofar as the following conditions are met: that the valve stem 11 has a spherical protuberance 25 supported by a support member 26 mounted in the valve casing 2 and is connected to the valve body 10 so that through both pivotal movement about the spherical protuberance 25 and rotational movement, the valve body 10 is engageable with and disengageable from the valve seat 1 and, when it is away from the valve seat 1, the valve body is rotatable.

The means for connection between the drive shaft 28 and the valve stem 11 is not limited to the one illustrated with respect to the foregoing embodiment, i.e., the inclined elongate hole 31 and the pin 32 for insertion therein. It is only necessary that the valve stem 11 and the drive shaft 28 are connected together so that the valve stem 11 rotates in cooperation with the rotation of the drive shaft 28 and oscillates in cooperation with the reciprocating movement of the drive shaft 28 in the longitudinal direction. Known means other than above described may be employed wherever convenient for the purpose.

In the above described embodiment, the valve casing 2 consists of three casings 2a, 2b, 2c; but the valve casing 2 may be of an integral construction or may be divided into a larger number of component casings. There is no particular limitation in number or configuration.

The only requirement here is that the valve casing 2 extends so as to cover the periphery of the valve stem 11 and drive shaft 28 to prevent leaking from the valve casing 2 of the fluid from the bearing portion at the spherical protuberance 25 of the valve stem 11 so the shaft seal packing 33 may be mounted between the valve casing 2 and the drive shaft 28.

The material of the shaft seal packing 33 for the drive shaft 28 may be varied according to the required conditions for use.

Next, the procedure for causing the drive shaft 28 to perform forward and reverse rotation and reciprocating movement in longitudinal directions will be explained.

At an initial stage, as illustrated in FIG. 3a, the cam followers 42 are positioned at one end of the helical cam grooves 38 and the stationary cam follower 45 are positioned at respective side groove portions of the other cam grooves 44, the control shaft 39 is rotated in the same direction as the direction of screw movement in the screw shaft portion 49.

Figure 6:
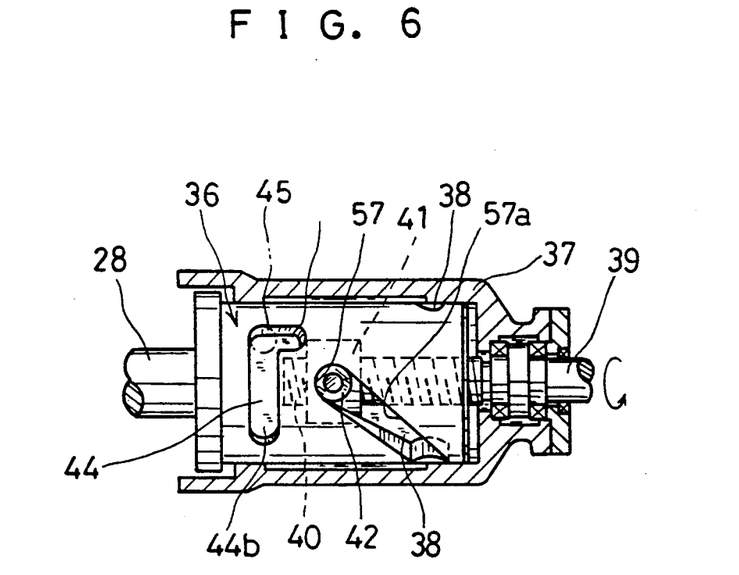
FIG. 6 is a sectional view showing the cylindrical cam in operation.

The screw element 41 is prevented from rotation by the engagement between the elongate hole 40 and the pins 56 is given an impetus to advance in the direction of arrow E. However, since the cylindrical cam 36 is prevented from advancing by the engagement between the stationary cam followers 45 and the side groove portions 44b, the cam followers 42 bias the respective inner sides 57 of the helical grooves 38 toward the direction of arrow E. This biasing force imparts a rotational force to the cylindrical cam 36. In this case, each cam follower 45 and the relevant side groove portion 44b slide relative to each other in peripheral directions of the cylindrical cam 36. Therefore, the cylindrical cam 36 is not prevented from rotational movement. Under the forwarding action of the screw element 41 and the cam followers 42, the cylindrical cam 36 turns 90 degrees to reach the other end of the helical cam grooves 38, as illustrated in FIG. 6. The stationary cam followers 45, simultaneously therewith, reach the junction of the side groove portion 44b and longitudinal groove portion 44a of each L-shaped cam groove 44. Thus, as illustrated in FIG. 5c, the drive shaft 28 rotates 90 degrees in the direction of arrow C.

Subsequently, the control shaft 39 is further rotated in the same direction and then the cylindrical cam 36 is prevented from rotation because of the engagement between the stationary cam followers 45 and the L-shaped cam grooves 44. When this condition is reached, no longer do the cam followers 42 allow the cylindrical cam 36 to rotate. Then, the cam followers 42 urge the inner side of the helical cam grooves 38 of the cylindrical cam 36 forward to advance the cylindrical cam 36. During the advance movement of the cylindrical cam 36, the longitudinal groove portions 44a move relative to the stationary cam followers 45 in the longitudinal direction of the cylindrical cam 36 and, accordingly, the cylindrical cam 36 is allowed to properly advance while being prevented from rotation. Accordingly, the drive shaft 28 is also allowed to advance. In other words, the drive shaft 28 slides forward in the direction of arrow D as illustrated in FIG. 5d.

Thereafter, the control shaft 39 is rotated in the opposite direction from the above mentioned direction. A biasing force for reverse movement acts on the screw element 41 and the cam followers 42. Therefore, the cam followers 42 press the inner sides 57a at the other end of the helical cam grooves 38 to retreat the cylindrical cam 36 and the shaft 28. Thus, the drive shaft 28 slides rearward in the direction of arrow A as illustrated in FIG. 5a.

Subsequently, the control shaft 39 is further rotated, then the drive shaft 28, as illustrated in FIG. 5b, rotates in the direction of arrow B. Because of the engagement between the stationary cam followers 45 and the L-shaped cam grooves 44, the cylindrical cam 36 and shaft 28 are independently caused to perform reverse movement and reverse rotation in the same way as discussed hereinabove.

In the above described embodiment, the cam grooves 38 and side groove portions 44b are formed over an angle range of 90 degrees. However, it is to be understood that the invention is not limited by such an angle range. In the present invention, the rotation angle for the cylindrical cam 36 and drive shaft 28 may be varied according to the formation angle, the stroke, of the cam grooves 38 and side groove portions 44b. Such a formation angle may be varied according to the design conditions of the drive shaft 28. Similarly, dimensions of the longitudinal groove portions 44a of the L-shaped cam grooves 44 may be varied according to the amount of reciprocating movement required of the drive shaft 28.

In this way, the arrangement of individual cam grooves 38, 44 of the cylindrical cam 36 may be varied in design. The cam grooves 38, 44 do not need to be two each in number as in the above described embodiment. What is necessary with the cylindrical cam 36 is that a helical cam groove 38 and a generally L-shaped cam groove 44 are formed independently in the peripheral wall of the cylindrical cam 36, and that the L-shaped cam groove consists of a longitudinal groove portion 44a extending in the longitudinal direction of the cylindrical cam 36 and a side groove portion 44b extending in the circumferential direction.

The cylindrical cam 36 should be slidably fitted in the casing 37 in such a way that the cam 36 is allowed to rotate and reciprocate in the longitudinal directions thereof with the drive shaft 28 connected to its one end. The configuration of the casing 37 is not limited. The casing 37 need not cover the entire area of the cylindrical cam 36.

There is no limitation on the configuration of the stationary cam follower 45 or means for mounting same. Stationary cam follower 45 may be simply of a pin configuration. It is only necessary that the stationary cam follower 45 is in engagement with the L-shaped cam groove 44 and suitably fixed in position so as to restrict and allow the movement of the cylindrical cam 36.

Further, there is no limitation on the manner of mounting the control shaft 39, type of thread, pitch or dimension of the thread of the screw shaft 49. The control shaft 39 may be controlled manually or otherwise, e.g., motor controlled. It is only necessary that it is formed with a threaded shaft portion 49 on its portion which is inserted into the cylindrical cam 36 for threaded engagement with the screw element 41.

Further, in the present invention, the construction of the screw element 41 and cam follower 42 is not limited to the above described embodiment and may be varied or changed in design within the intended scope of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A butterfly valve having a spherical protuberance formed on a valve stem connected to a valve body, the spherical protuberance being supported in a support member mounted in a casing, the valve body being engageable with and disengageable from a valve seat through pivotal movement and rotational movement of the valve stem about the spherical protuberance so that the valve body is rotatable when it is away from the valve seat, said butterfly valve comprising:

a drive shaft disposed at a location adjacent the outer end of the valve stem and extending outwardly therefrom, the drive shaft being rotatable forward and reverse and reciprocable in longitudinal directions of the valve stem;

one end of the drive shaft being connected to the outer end of the valve stem to enable the valve stem to rotate in cooperation with the reciprocating movement of the drive shaft in the longitudinal directions thereof; and a packing member for shaft sealing with respect to the drive shaft which is disposed between the drive shaft and an outwardly extending portion of the valve casing for covering the outer peripheries of the valve stem and the drive shaft.

2. A butterfly valve as set forth in claim 1, wherein the valve stem consists of a first valve stem mounted to the valve body and a second valve stem having a spherical protuberance and connected to the drive shaft;

said two valve stems are connected to each other so that the first valve stem oscillates and rotates in conjunction with the oscillation and rotation of the second valve stem; and wherein a distance between oscillation center position of the second valve stem and the position at which the second valve stem is connected to the first valve stem is set shorter than a distance between said center position and position at which the second valve stem is connected to the drive shaft.

3. A butterfly valve as set forth in claim 1, wherein connection means for connecting the drive shaft to the valve stem comprise an open cut groove formed in the drive shaft for receiving the outer end of the valve stem, and an inclined elongate hole bored in the outer end portion of the valve stem and a pin for insertion into the elongate hole.

4. A butterfly valve as set forth in claim 2, wherein connection means for connecting the drive shaft to the valve stem comprise an open cut groove formed in the drive shaft for receiving the outer end of the valve stem, and an inclined elongate hole bored in the outer end portion of the valve stem and a pin for insertion into the elongate hole.

5. A butterfly valve as set forth in claim 1, wherein said valve casing consists of a valve casing body and auxiliary casings connected to sides of the valve casing body.

6. A drive mechanism for rotation and reciprocating movement of a valve stem of a butterfly valve, comprising:

a cylindrical cam connected at one end to a drive shaft and having helical cam grooves formed in its peripheral wall;

a casing which allows the cylindrical cam to be slidably received and supported therein in its axial direction and also in its peripheral direction;

a control shaft rotatably received in the cylindrical cam and having a screw shaft portion positioned in the cylindrical cam;

a screw element threadedly fitted on the screw shaft portion of the control shaft and prevented from rotating, said screw element being threadedly movable in axial directions of the cylindrical cam following the rotational movement of the control shaft; and cam followers mounted to the screw element and held in engagement with the helical cam grooves of the cylindrical cam;

said cylindrical cam further having generally L-shaped cam grooves formed in a peripheral wall, the L-shaped cam grooves each consisting of a longitudinal groove portion extending in the longitudinal direction of the cylindrical cam and a side groove extending in the peripheral direction of the cylindrical cam;

the L-shaped cam grooves being engaged by stationary cam followers which, when in engagement with the side groove portion, prevent movement of the cylindrical cam in longitudinal directions of the cylindrical cam to allow the cylindrical cam to rotate and, when in engagement with the longitudinal groove portion, prevent rotation of the cylindrical cam to allow the cylindrical cam to move in longitudinal directions of the cylindrical cam.

7. A drive mechanism for rotation and reciprocating movement of a valve stem of a butterfly valve as set forth in claim 6, wherein engagement pins extending outwardly to a greater extent relative to the cam followers of the screw element are in engagement with the elongate holes at sides of the casing, whereby the screw element is prevented from rotating in the peripheral direction of the cylindrical cam.

8. A drive mechanism for rotation and reciprocating movement of a valve stem of a butterfly valve as set forth in claim 6, wherein said stationary cam followers are stationarily disposed in position on side walls of the casing.

* * * * *